Dec. 15, 1959  G. A. STAUB  2,917,181
STORAGE RACK FOR PIPE-LIKE OBJECTS
Filed Feb. 7, 1958
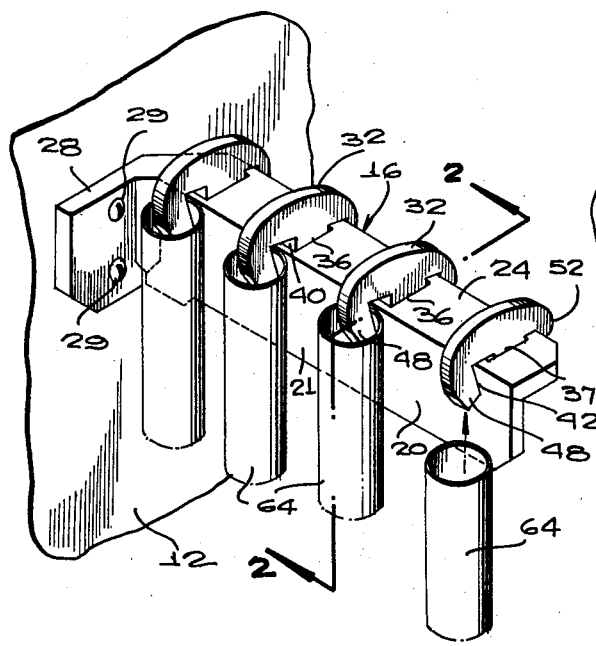
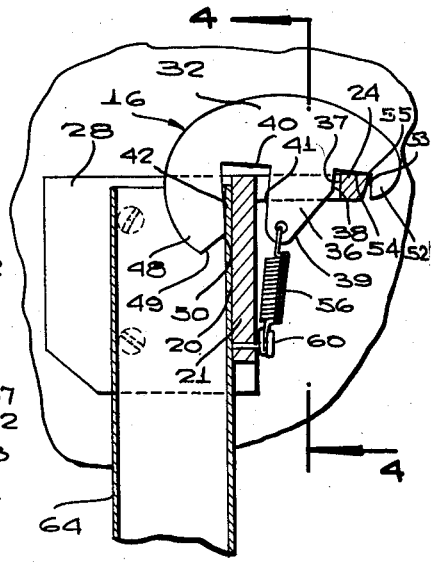
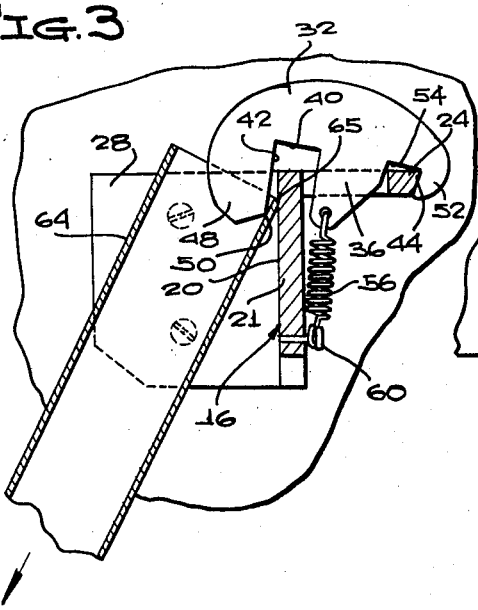
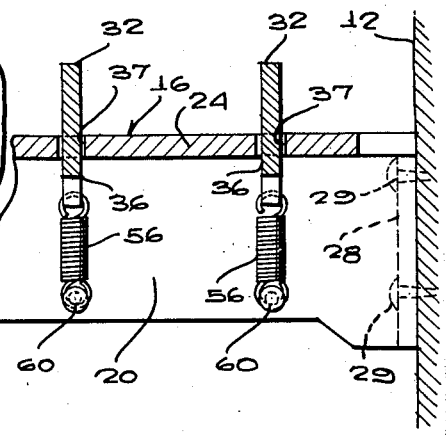
INVENTOR.
GUY A. STAUB
BY
McMorrow, Berman & Davidson
ATTORNEYS

United States Patent Office 2,917,181
Patented Dec. 15, 1959

2,917,181

STORAGE RACK FOR PIPE-LIKE OBJECTS

Guy A. Staub, New Oxford, Pa.

Application February 7, 1958, Serial No. 713,983

8 Claims. (Cl. 211—60)

This invention relates generally to storage or support racks, and more particularly, has reference to a rack that is designed especially for supporting, in positions suspended from the rack, a plurality of pipe-like objects as for example, automobile tail pipes.

The storage of pipe-like objects, in position where a selected one of said objects can be removed without disturbance of the remaining objects, is a problem in many establishments. A typical example is found in automobile repair shops. It is customary in such establishments to keep various spare parts, so that they will be readily available in the event they are needed during repair of a particular vehicle. Among such parts are automobile tail pipes, and these should be so supported as to permit any individual pipe to be swiftly located and removed, without interfering with or being interfered with by the remaining tail pipes.

The support of a pipe-like object, particularly one which is to be used in such a way as to require that the object be kept in an undamaged condition, presents, however, a number of problems. To support a plurality of the objects separately from one another in a manner to prevent access to any one of the same, while insuring against damage to any of the supported objects or articles, is difficult. Clamp devices that embrace the object have the disadvantage of tending to mar or otherwise damage the side walls of the same. In a tail pipe, said damage may manifest itself in perforations of the side wall, and this of course prevents the tail pipe from being used as a new replacement part or as a part that will pass State inspections and will not offer a hazard to occupants of the vehicle.

In view of the difficulties noted above, the main object of the present invention is to provide a device for supporting pipe-like articles, which device will be designed to support the articles in positions such that access to any of them can be had without interference from the remaining articles.

It is a further object to so support the articles that no damage thereto will result.

Another object is to facilitate the engagement of the supported articles with the storage rack, responsive merely to movement of the articles upwardly into their supported position.

Another object is to provide equal facility in disengaging a selected object from the storage rack, the disengagement being accomplished merely responsive to rocking of the articles, followed by downward movement thereof.

Other objects will appear from the following description, the claims appended thereto, and from the annexed drawing, in which like reference characters designate like parts throughout the several views, and wherein:

Figure 1 is a perspective view of a storage rack according to the present invention, as it appears when in use;

Figure 2 is an enlarged transverse sectional view substantially on line 2—2 of Figure 1;

Figure 3 is a view like Figure 2 in which the object is being removed; and

Figure 4 is a sectional view, on the same scale as Figure 2, taken substantially on line 4—4 of Figure 2.

Referring to the drawing in detail, designated at 12 is a wall surface, on which is mounted the storage rack 16 constituting the present invention.

The storage rack includes a support arm 20, formed of angle iron material or the like, so as to include, along one longitudinal edge of the storage arm, a side wall 21 disposed in a vertical plane, said side wall being integral along its top longitudinal edge with a top wall 24 disposed in a horizontal plane. In other words, walls 21, 24 are fixedly secured in right-angular relationship.

At one end, arm 20 is integrally formed with a laterally projecting ear or bracket 28, disposed in face-to-face contact with wall 12 and fixedly secured to the wall with screws 29 or equivalent fastening elements.

Designated at 32 are like clamping arms, each of which is extended transversely of the top wall 24 in overlying relation to the top wall. The clamping arms 32 are formed from flat metal stock, each clamping arm being disposed in a vertical plane perpendicular to the vertical plane of the side wall 21.

The clamping arms 32 are uniformly spaced along the length of the support arm 20, and of course, any number of the arms 32 could be provided, depending upon the number of pipe-like objects that are to be supported from the device.

Since all the clamping arms 32 are identical, the description of one will suffice for all. Referring to Figure 2, each clamping arm 32 is formed medially between its opposite ends with a depending ear 36, said ear 36 tapering in a downward direction from a location adjacent its proximal end.

Ear 36 extends downwardly through a transverse slot 37 formed in top wall 24.

As will be noted from Figure 4, slot 37 is slightly wider than the thickness of the ear 32. Further, as shown in Figure 2, the slot 37 is slightly longer than the width of the proximal end portion 38 of the ear. Free rocking movement of the clamping arm 32 between its Figure 2 and Figure 3 positions is thus assured.

The proximal end portion 38 of the ear is of constant width, that is, said portion 38 has parallel edges from the inner extremity of the ear to the beginning or wider end of the tapered distal end portion 39 of the ear.

The provision of ear 36 defines, at opposite sides thereof, downwardly opening, angular, deep recesses 40, 44. Recess 40 is substantially larger than recess 44, and one wall 41 thereof is defined by the adjacent edge of ear 36. The other wall 42 of recess 40 is slightly inclined out of parallelism to wall 41, that is, walls 41, 42 of recess or notch 40 are angularly related. For the purposes of the present application, it is merely sufficient to note, from Figure 2, that when arm 32 is in its clamping position shown in this figure of the drawing, the wall 42 is angularly related to the plane of the adjacent side wall 21 of the support arm 20, for a purpose to be made presently apparent.

At one end, arm 32 has a depending clamping finger 48, the inside edge of which is defined by the wall 42. Finger 48 has a bluntly pointed distal end 49, defining in cooperation with the wall 42 a nose 50 constituting the point upon the finger 48 that cooperates with side wall 21 in clampably engaging the pipe-like object.

At the other end of the clamping arm 32 there is provided a depending projection 52, substantially smaller than finger 48 and having an inside edge 53 forming one wall of recess 44. Edge 53 has a juncture with the inner wall 54 of recess 44, and edge 53 and wall 54 are at a slight obtuse angle to one another, forming an obtusely-angular corner 55 in recess 44, which corner provides the pivot point for the arm 32 when it swings between its Figure 2 and Figure 3 positions.

Designated at 56 is a contractile, coil spring one end of which is hooked to the ear 36 and the other end of which is hooked about a headed fastener 60 projecting from the side wall 21. Spring 56, tending to contract, resiliently, yieldably swings the arm 32 upon its pivot point 55 downwardly, to its normal, Figure 2 position. In this position, the arm will clampably engage a pipe-like object 64 against side wall 21. As will be noted, the downward pull of the spring 56 causes the nose 50 to enter the upper end of the vertically disposed object 64, with the nose 50 bearing against the inner surface of the side wall of said object, so as to cause the object to be gripped between the clamping finger 48 and the side wall 21 of arm 20.

Assuming that one desires to remove the tail pipe, one need merely rock the pipe from its Figure 2 position to its Figure 3 position, with the pipe or other object 64 pivoting upon the side wall 21, at the upper end 65 of the object 64.

The object 64 thus cammingly biases the clamping arm 32 upwardly from its Figure 2 position to its Figure 3 position, with the arm rocking to the Figure 3 position against the restraint of spring 56. Nose 50 slides upwardly along the inner surface of the object 64. Then, the object when rocked to its Figure 3 position is merely pulled downwardly as shown by the arrow in Figure 3, causing the same to be swiftly and easily disengaged from the supporting arm.

As soon as the object is disengaged from the associated clamping arm 32, spring 56 will contract, and will swing the arm downwardly. Nose 50 will bear against the wall 21. However, by reason of the bluntly pointed end 49 of the clamping finger, and by reason of the slight angular disposition of the edge 42 in respect to the plane of the side wall 21, one may readily engage an object 64 in supported position by moving the object vertically upwardly along the wall 21 in the manner indicated by the pipe-like object shown furthest to the right in Figure 1.

This will cause the object to cammingly bias the nose 50 away from the side wall 21, so that the object moves to the position shown in Figure 2. On release of the same, it will be held in supported position by reason of the pull of the spring 56, which causes the previously described clamping engagement of the arm 32 with the object 64.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A support rack for pipe-like objects comprising a support arm; at least one clamping arm rockably mounted upon said support arm; and resilient, yielding means connected between the clamping arm and support arm and resiliently biasing the clamping arm in one direction about its pivot axis, the clamping arm being proportioned at one end for entering a pipe-like object to clampably engage said object between said one end of the clamping arm and the adjacent portion of the support arm, said support arm being of angular cross section and including a side wall disposed in a vertical plane and constituting the portion of the support arm against which the object is clampably engaged, the clamping arm, at said one end thereof, having a depending clamping finger constituting the portion of the clamping arm entering the object to be supported, said clamping finger having a bluntly pointed distal end for facilitating extension of the side wall of the supported object between the clamping finger and said adjacent side wall of the support arm, the clamping arm including intermediate its ends a depending ear to which said resilient, yielding means is connected, said ear being spaced longitudinally of the clamping arm from the clamping finger, said clamping arm being positioned transversely of the support arm, the support arm having a transverse slot through which said ear projects in a downward direction, to guide the clamping arm during its rocking movement on the support arm.

2. A support rack for pipe-like objects comprising a support arm; at least one clamping arm rockably mounted upon said support arm; and resilient, yielding means connected between the clamping arm and support arm and resiliently biasing the clamping arm in one direction about its pivot axis, the clamping arm being proportioned at one end for entering a pipe-like object to clampably engage said object between said one end of the clamping arm and the adjacent portion of the support arm, said support arm being of angular cross section and including a side wall disposed in a vertical plane and constituting the portion of the support arm against which the object is clampably engaged, the clamping arm, at said one end thereof, having a depending clamping finger constituting the portion of the clamping arm entering the object to be supported, said clamping finger having a bluntly pointed distal end for facilitating extension of the side wall of the supported object between the clamping finger and said adjacent side wall of the support arm, the clamping arm including intermediate its ends a depending ear to which said resilient, yielding means is connected, said ear being spaced longitudinally of the clamping arm from the clamping finger, said clamping arm being positioned transversely of the support arm, the support arm having a transverse slot through which said ear projects in a downward direction, to guide the clamping arm during its rocking movement on the support arm, the clamping arm, at the other end thereof, including a depending projection cooperating with said ear in defining therebetween a downwardly opening recess, said recess receiving an adjacent portion of the support arm, the pivot point of the clamping arm being disposed at one corner of said recess.

3. A storage rack for pipe-like objects comprising: a support arm including a top wall formed with at least one transverse slot therethrough and with a side wall depending from and extending along one longitudinal edge of the top wall adjacent one end of the slot; at least one clamping arm overlying and extending transversely of the top wall, one end of the clamping arm resting upon and being fulcrumed on said top wall at the other end of the slot, said clamping arm intermediate its ends including a depending ear guided within the slot during rocking of the clamping arm about its pivot to limit the clamping arm against lateral displacement during the rocking thereof, said ear having a lower end projecting beyond the slot below said top wall, the clamping arm at its other end including a depending finger extending downwardly along said side wall and proportioned for insertion in a pipe-like object, said finger and side wall being disposed for clamping of said object therebetween on rocking of the clamping arm downwardly about its pivot; and a contractile spring connected between the ear and side wall and resiliently, yieldably biasing the clamping arm in a downward direction about its pivot so as to normally retain the finger in its object-clamping position, said support arm, at the other end of the slot, extending as an abutment engaging the clamping arm between the finger and said ear so as to limit the clamping arm against downward movement beyond said clamping position of the finger.

4. A storage rack as in claim 3, wherein the finger and ear define a downwardly-opening recess therebetween into which said abutment extends, one edge of the recess extending crosswise of the abutment and constituting the portion of the clamping arm bearing against the abutment, a second edge of the recess constituting one side edge of the finger and extending in confronting relation to said side wall whereby to cooperate therewith in the clamping engagement of said object between the finger and side wall.

5. A storage rack as in claim 4, wherein the arm has a second downwardly-opening recess at the side of the ear opposite from that at which the first recess is located, the second recess receiving said top wall at the other end of the slot, one edge of the second recess bearing against said top wall to cooperate therewith in providing the fulcrum of the clamping arm.

6. A storage rack as in claim 5, wherein said recesses loosely receive the adjacent portions of the support arm with said one edge of the recesses slidably contacting the support arm, for limited sliding movement of the clamping arm in the direction of its length upon the support arm, whereby to effect adjustments of the distance between said finger and said side wall of the support arm to accommodate different thicknesses of the clamped object.

7. A storage rack as in claim 6, wherein the top wall and side wall of the support arm are of flat formation and are disposed in normally related planes, said clamping arm being in the form of a flat plate and lying in a plane normal to the planes of the top wall and side wall.

8. A storage rack as in claim 6, wherein the recesses are proportioned to permit free movement of the clamping arm wholly out of engagement with the support arm, responsive to bodily movement of the clamping arm in an upward directing off the support arm with the spring disconnected from the clamping arm.

References Cited in the file of this patent

UNITED STATES PATENTS

| | | |
|---|---|---|
| 750,634 | Gable | Jan. 26, 1904 |
| 781,384 | Weitershausen | Jan. 31, 1905 |
| 1,108,055 | Wolfe | Aug. 18, 1914 |